United States Patent
Yin et al.

(10) Patent No.: US 9,859,773 B2
(45) Date of Patent: Jan. 2, 2018

(54) CEILING FAN MOTOR

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW); Bo-Wei Chiou, Kaohsiung (TW); Yu-Yuan Lu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 320 days.

(21) Appl. No.: 14/713,236

(22) Filed: May 15, 2015

(65) Prior Publication Data

US 2015/0340930 A1 Nov. 26, 2015

(30) Foreign Application Priority Data

May 21, 2014 (TW) .............................. 103117800 A

(51) Int. Cl.
| | |
|---|---|
| *H02K 9/06* | (2006.01) |
| *H02K 1/28* | (2006.01) |
| *H02K 1/27* | (2006.01) |
| *H02K 1/32* | (2006.01) |

(52) U.S. Cl.
CPC ............ *H02K 9/06* (2013.01); *H02K 1/2786* (2013.01); *H02K 1/28* (2013.01); *H02K 1/32* (2013.01)

(58) Field of Classification Search
CPC ........... H02K 9/06; H02K 1/2786; H02K 1/28
USPC ................................. 310/61, 156.01, 156.26
IPC ........................................ H02K 1/27,1/28, 9/06
See application file for complete search history.

(56) References Cited

U.S. PATENT DOCUMENTS

| | | | | |
|---|---|---|---|---|
| 4,701,654 A | * | 10/1987 | Tatukawa ............. | H02K 1/2786 310/153 |
| 6,075,301 A | * | 6/2000 | Shinoda ................. | H02K 1/185 310/154.17 |
| 7,548,006 B2 | * | 6/2009 | Yu ............................ | H02K 1/17 310/156.12 |
| 8,288,914 B2 | * | 10/2012 | Qin .......................... | H02K 1/17 310/154.03 |
| 2006/0066172 A1 | * | 3/2006 | Takeuchi ............. | H02K 21/222 310/52 |
| 2006/0103253 A1 | * | 5/2006 | Shiga ..................... | H02K 15/03 310/156.45 |
| 2007/0024142 A1 | * | 2/2007 | Kihara ..................... | H02K 9/06 310/156.26 |
| 2007/0090710 A1 | | 4/2007 | Chen | |

(Continued)

FOREIGN PATENT DOCUMENTS

| | | |
|---|---|---|
| CN | 200987086 Y | 12/2007 |
| CN | 201742188 U | 2/2011 |

(Continued)

*Primary Examiner* — John K Kim
(74) *Attorney, Agent, or Firm* — Alan D. Kamrath; Kamrath IP Lawfirm, P.A.

(57) ABSTRACT

A ceiling fan motor includes a stator assembly and a rotor. The stator assembly includes an iron core. The rotor is rotatably coupled with the stator assembly and includes a housing, a first positioning member and at least one permanent magnet. The housing includes a lateral wall. The lateral wall is enclosed to form an inner space adapted to receive the iron core. The first positioning member is coupled with the lateral wall. The at least one permanent magnet is positioned by the first positioning member. The first positioning member includes a plurality of air-guiding blades.

20 Claims, 5 Drawing Sheets

(56) References Cited

U.S. PATENT DOCUMENTS

2012/0043843 A1* 2/2012 Wu .................. H02K 1/2786
                                                        310/156.12
2015/0176588 A1   6/2015 Yin et al.
2015/0340930 A1* 11/2015 Yin .................. H02K 1/2786
                                                        310/61

FOREIGN PATENT DOCUMENTS

| TW | M288735 U   | 3/2006 |
| TW | M312835 U   | 5/2007 |
| TW | 201210174 A | 3/2012 |
| TW | 201526479 A | 7/2015 |

* cited by examiner

CEILING FAN MOTOR

BACKGROUND OF THE INVENTION

1. Field of the Invention

The present invention generally relates to a ceiling fan motor and, more particularly, to a ceiling fan motor capable of providing a desired cooling effect for the internal components thereof via the use of an air-guiding blade.

2. Description of the Related Art

FIG. 1 shows a conventional ceiling fan motor 9 including a stator assembly 91 and a rotor 92. The stator assembly 91 includes a shaft 911 and an iron core 912 circumferentially arranged around the shaft 911. The rotor 92 is rotatably coupled with the shaft 911 and includes a housing 921. The housing 921 has a chamber for receiving the iron core 912. A positioning portion 922 is arranged on the inner periphery of the housing 921 for positioning a plurality of permanent magnets 923. Such a ceiling fan motor 9 can be seen in Taiwan Patent Application No. 102148019.

Since the iron core 912 is received in the housing 921, during the operation of the ceiling fan motor 9, it is difficult to effectively dissipate the heat generated due to the hysteresis loss and the eddy loss of the iron core 912 and the windings of the iron core 912. As a result, the stator assembly 91 often remains in a high temperature for a long time. Consequently, the service life of the ceiling fan motor 9 is affected.

Although the housing 921 of the ceiling fan motor 9 may form a plurality of holes or may be spaced from the iron core 912 by a gap in order not to form a closed structure where heat cannot be easily expelled, the heat of the iron core 912 and its windings still remains inside the ceiling fan motor 9 since the ceiling fan motor 9 is usually mounted at a high position (such as the ceiling) where heat often gathers. In addition, the ceiling fan motor 9 often remains in a high temperature due to the long operational time, leading to a higher failure rate of the ceiling fan motor 9.

In light of the disadvantages of the ceiling fan motor 9 such as difficult heat dissipation of the internal components, short service life and higher failure rate, it is necessary to provide a novel ceiling fan motor with an improved heat dissipation efficiency.

SUMMARY OF THE INVENTION

It is therefore the objective of this invention to provide a ceiling fan motor where a positioning member is coupled to an inner periphery of the housing of the rotor. The positioning member includes a plurality of positioning notches in which a plurality of magnets can be fixed. In this regard, an air-guiding blade is arranged on the positioning member, so that the air-guiding blade can be driven to rotate by the rotating housing when the rotor rotates. As such, air currents are generated to provide a cooling effect for the internal components of the housing. Advantageously, the cooling effect of the internal components of the housing is improved.

In an embodiment of the invention, a ceiling fan motor includes a stator assembly and a rotor. The stator assembly includes an iron core. The rotor is rotatably coupled with the stator assembly and includes a housing, a first positioning member and at least one permanent magnet. The housing includes a lateral wall. The lateral wall is enclosed to form an inner space adapted to receive the iron core. The first positioning member is coupled with the lateral wall. The at least one permanent magnet is positioned by the first positioning member. The first positioning member includes a plurality of air-guiding blades.

In a form shown, each of the plurality of air-guiding blades is connected to the first positioning member and extends from the first positioning member towards the iron core.

In the form shown, the first positioning member includes at least one positioning notch, and the at least one permanent magnet is fixed in the at least one positioning notch.

In the form shown, the at least one permanent magnet includes a plurality of permanent magnets, the at least one positioning notch includes a plurality of positioning notches, and each of the plurality of permanent magnets is fixed in a respective one of the plurality of positioning notches.

In the form shown, the first positioning member includes a support and a plurality of walls. The support is in an annular form and is connected to the plurality of walls, and two adjacent walls and the support jointly form one of the at least one positioning notch.

In the form shown, each of the plurality of air-guiding blades is connected to one of the plurality of walls of the first positioning member.

In the form shown, the housing forms a plurality of vents extending from an outer surface to an inner surface thereof.

In the form shown, the housing includes a bottom cover coupled with the lateral wall. The lateral wall and the bottom cover jointly form the inner space. The plurality of vents is arranged on an edge of the lateral wall adjoining the bottom cover, and is aligned with the plurality of air-guiding blades along an axial direction of the rotor. The plurality of engaging portions is arranged on the support.

In the form shown, the housing further includes a plurality of fixing notches. A plurality of engaging portions is connected to one face of the first positioning member facing the plurality of fixing notches. The plurality of engaging portions is engaged with the plurality of fixing notches.

In the form shown, the housing includes a bottom cover coupled with the lateral wall. The lateral wall and the bottom cover jointly form the inner space. The plurality of fixing notches is arranged on an edge of the lateral wall adjoining the bottom cover. The plurality of engaging portions is aligned with the plurality of fixing notches along an axial direction of the rotor.

In the form shown, the rotor further includes a second positioning member. The first and second positioning members are coupled to the lateral wall. The second positioning member also includes at least one positioning notch. The at least one positioning notch of the first positioning member is aligned with the at least one positioning notch of the second positioning member along an axial direction of the rotor.

In the form shown, the first positioning member includes an air-guiding blade, and the second positioning member also comprises an air-guiding blade aligned or misaligned with the air-guiding blade of the first positioning member along the axial direction of the rotor.

In the form shown, each of the first and second positioning members includes a first coupling portion and a second coupling portion. The first coupling portion of the first positioning member is aligned with the second coupling portion of the second positioning member along the axial direction of the rotor, and the second coupling portion of the first positioning member is aligned with the first coupling portion of the second positioning member along the axial direction of the rotor. The first coupling portion is in a form of a tenon, and the second coupling portion is in a form of an engaging notch.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
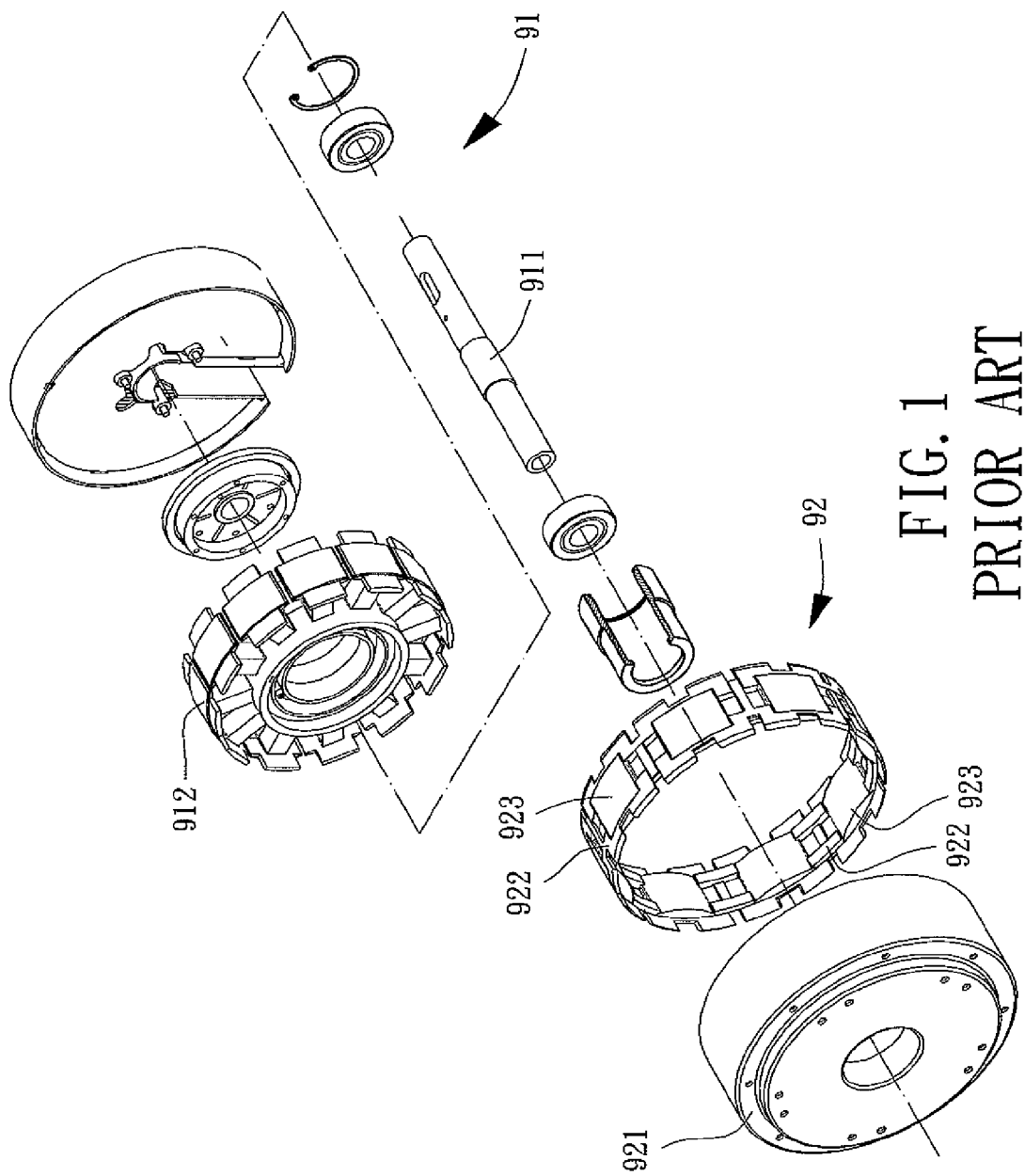
FIG. 1 is an exploded view of a conventional ceiling fan motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
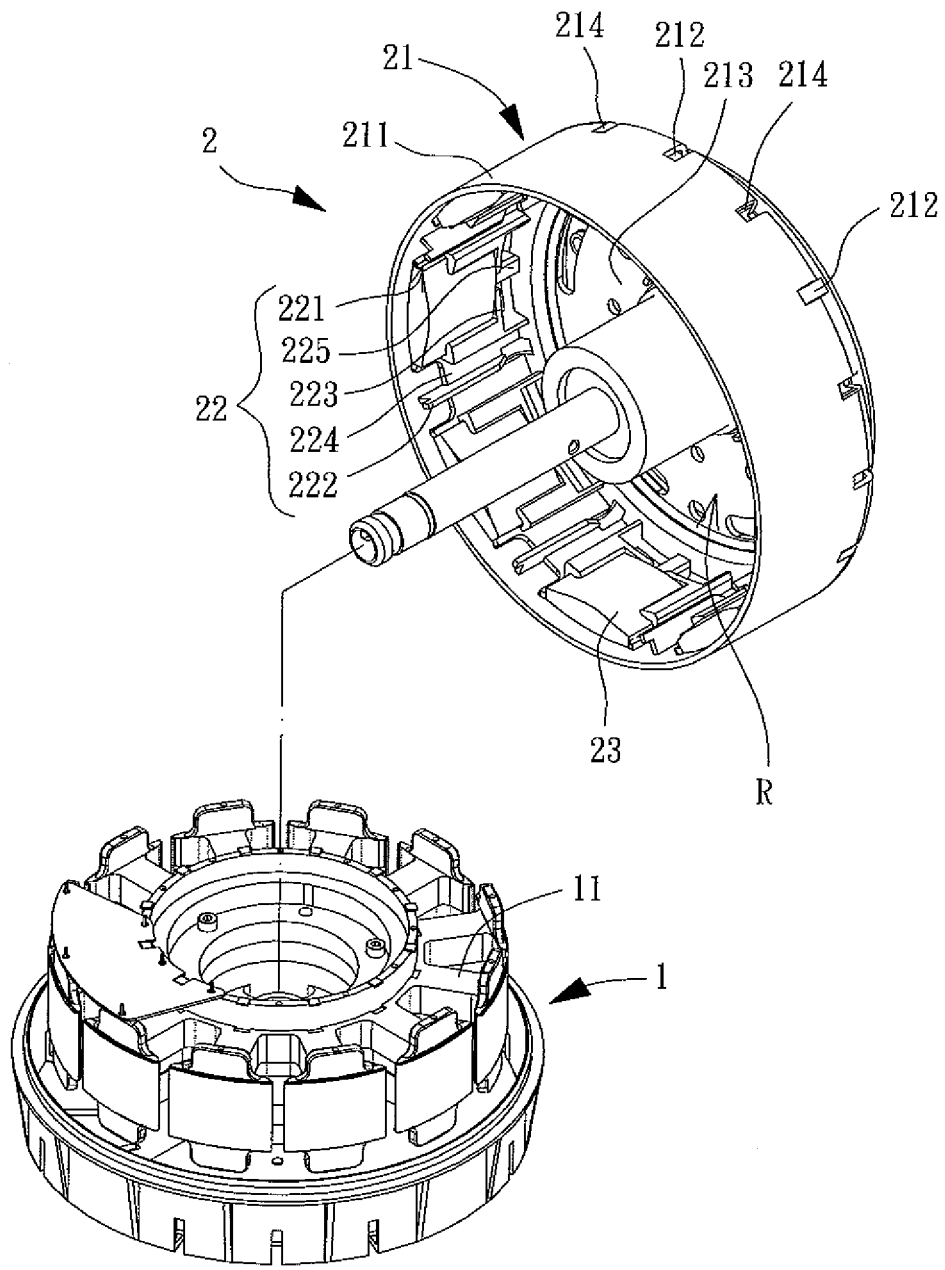
FIG. 2 is an exploded view of a ceiling fan motor according to a first embodiment of the invention.

FIG. 2 shows a ceiling fan motor according to a first embodiment of the invention. The ceiling fan motor includes a stator assembly 1 and a rotor 2 coupled with the stator assembly 1. The stator assembly 1 includes an iron core 11 that can be wound with a plurality of windings (not shown), as it can be readily appreciated by the skilled persons.

Figure 3:
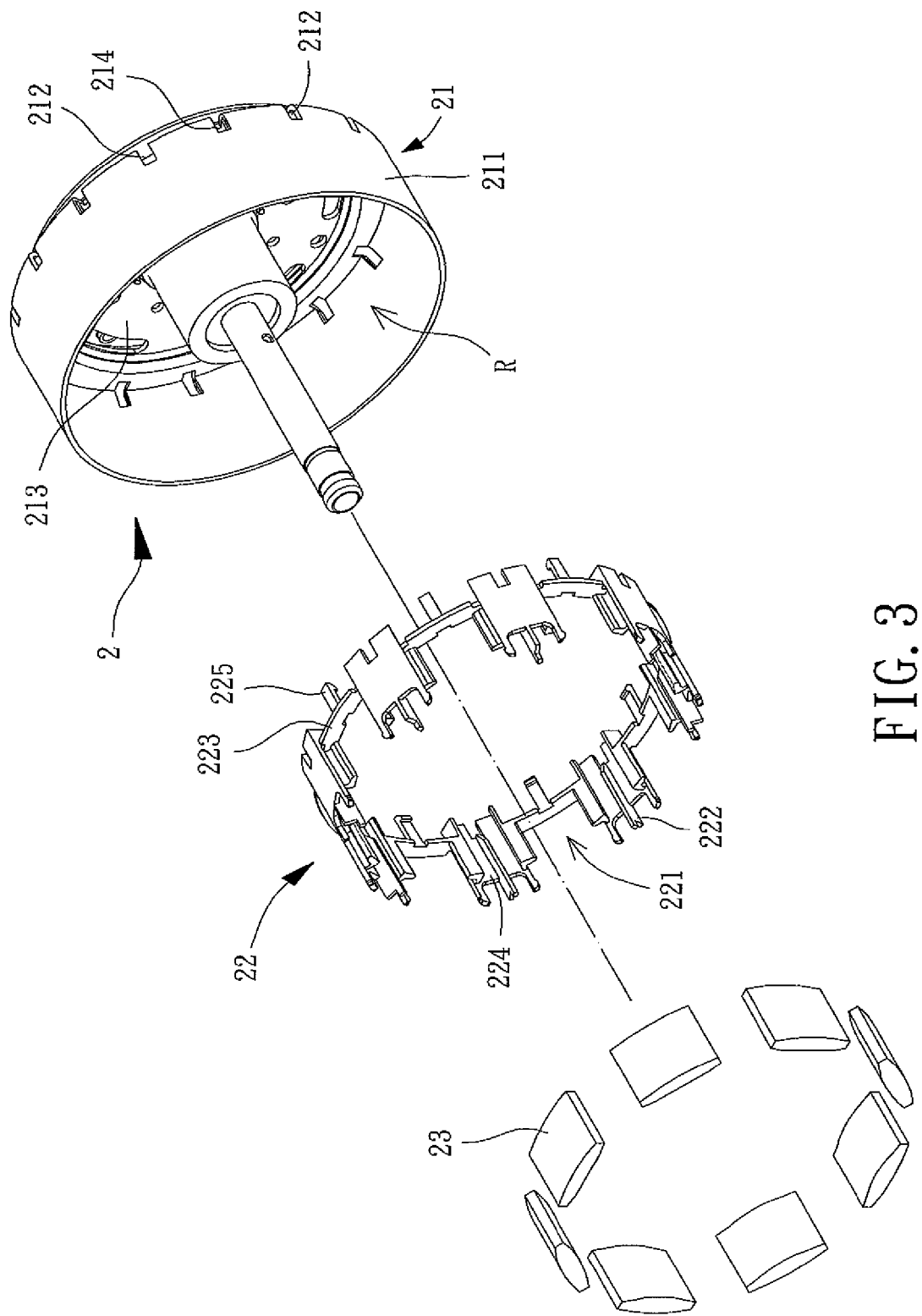
FIG. 3 is an exploded view of a rotor of the ceiling fan motor according to the first embodiment of the invention.
Figure 4:
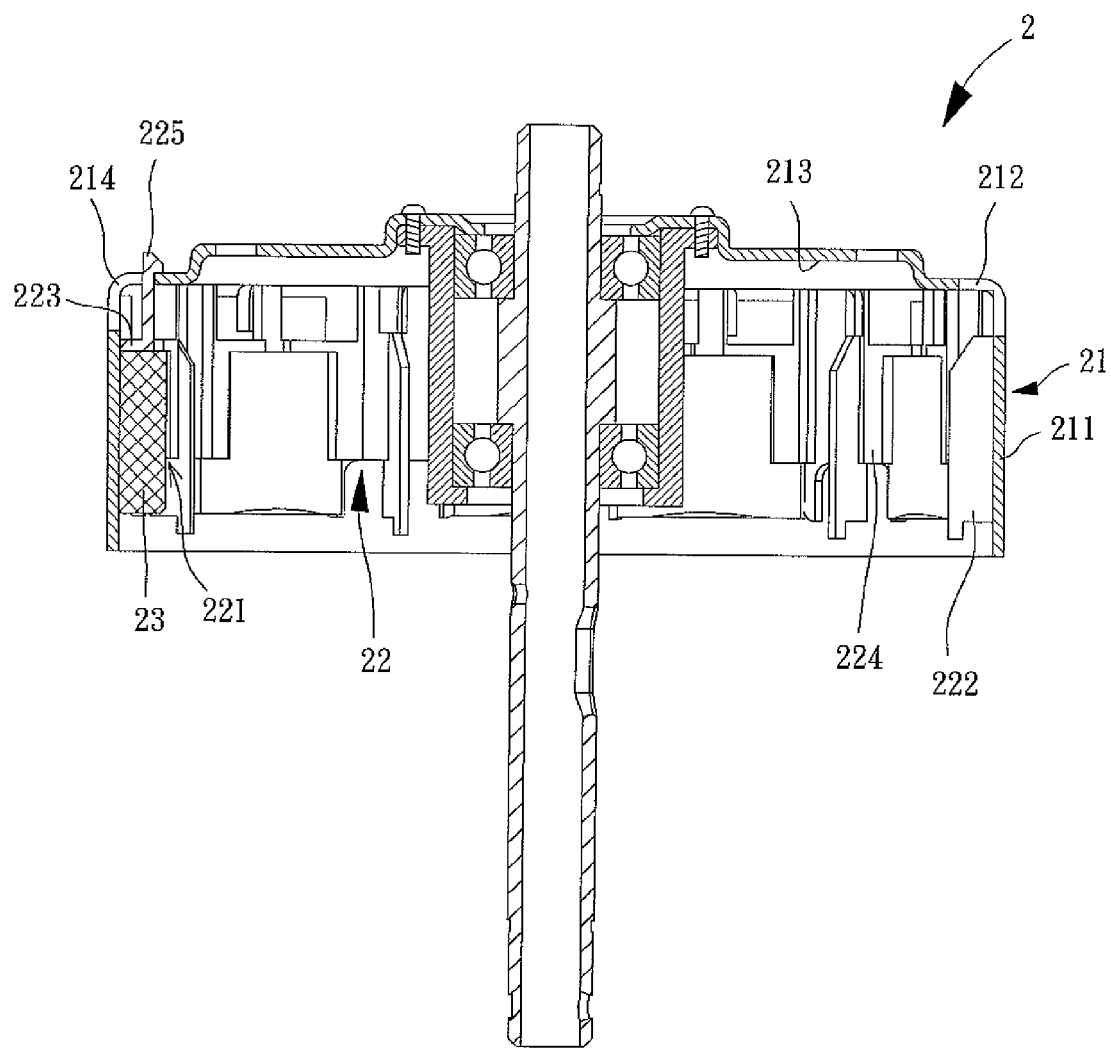
FIG. 4 is a cross sectional view of the rotor of the ceiling fan motor according to the first embodiment of the invention.

The rotor 2 is rotatably coupled with the stator assembly 1. Referring to FIGS. 3 and 4, the rotor 2 includes a housing 21, a positioning member 22 and at least one permanent magnet 23. The housing 21 may be coupled with the stator assembly 1 via a bearing or other conventional pivoting structures. The positioning member 22 is coupled with the housing 21 for positioning the at least one permanent magnet 23. The housing 21 includes a lateral wall 211 which forms an inner space "R" for receiving the iron core 11. The positioning member 22 is coupled to an inner periphery of the lateral wall 211 and includes at least one positioning notch 221. The at least one permanent magnet 23 is fixed in the at least one positioning notch 221. The at least one permanent magnet 23 may include a single permanent magnet such as an annular magnet. However, there are several permanent magnets 23 in this embodiment. Accordingly, the at least one positioning notch 221 may include a plurality of positioning notches 221, and each permanent magnet 23 is fixed in a respective positioning notch 221. The permanent magnets 23 are spaced from the iron core 11 by a gap, so that the housing 21 is able to surround the iron core 11 while rotating. As such, the rotor 2 is able to rotatably couple with the stator assembly 1. Moreover, the positioning member 22 includes an air-guiding blade 222 connected to the positioning member 22. The air-guiding blade 222 extends from the positioning member 22 towards the iron core 11. However, the positioning member 22 preferably includes a plurality of air-guiding blades 222 that is connected to the positioning member 22 and extends from the positioning member 22 towards the iron core 11.

Specifically, the positioning member 22 includes a support 223 and a plurality of walls 224. The support 223 is in the annular form and is connected to the plurality of walls 224. Each wall 224 preferably extends in an axial direction of the rotor 2. In this arrangement, two adjacent walls 224 and the support 223 jointly form the positioning notch 221 for positioning one permanent magnet 23. In this embodiment, each wall 224 is provided with one air-guiding blade 222. However, each wall 224 may also be provided with more than one air-guiding blade 222. Alternatively, it is possible that only one of the plurality of walls 224 is provided with the air-guiding blade 222.

Based on this, when the ceiling fan motor according to the first embodiment of the invention is in use, the plurality of air-guiding blades 222 arranged on the positioning member 22 may be driven to rotate as the housing 21 rotates. As such, air currents are generated to provide a cooling effect for the iron core 11 or other components. Since each air-guiding blade 222 extends from the positioning member 22 towards the iron core 11, the rotating air-guiding blades 222 are able to generate air currents that flow towards the iron core 11, ensuring that the heat of the hysteresis loss and the eddy loss can be expelled.

It is noted that the housing 21 of the rotor 2 may form a plurality of vents 212 extending from the outer surface to the inner surface of the housing 21 and communicating with the inner space "R." The plurality of vents 212 may be arranged on the lateral wall 211. Specifically, the housing 21 includes a bottom cover 213 coupled with the lateral wall 211. The lateral wall 211 and the bottom cover 213 jointly form the inner space "R." The plurality of vents 212 is preferably formed on the edge of the lateral wall 211 adjoining the bottom cover 213. The plurality of vents 212 is preferably aligned with the air-guiding blades 222 along the axial direction of the rotor 2. In this arrangement, the air-guiding blades 222 are able to draw air into the housing 21 or expel air from the housing 21 via the plurality of vents 212, providing a cooling effect for the internal components of the housing 21.

Moreover, the housing 21 of the rotor 2 may include a plurality of fixing notches 214. Similar to the plurality of vents 212, the plurality of fixing notches 214 may be formed on the edge of the lateral wall 211 adjoining the bottom cover 213. Accordingly, a plurality of engaging portions 225 may be connected to one face of the positioning member 22 facing the plurality of fixing notches 214. The plurality of engaging portions 225 may be engaged with the support 223 and is aligned with the plurality of fixing notches 214 along the axial direction of the rotor 2. As such, the plurality of engaging portions 225 may be engaged with the plurality of fixing notches 214, thereby engaging the positioning member 22 with the housing 21. However, the positioning member 22 may also be coupled with the housing 21 by ways of welding, screwing, adhesion or fusing. Thus, disengagement between the positioning member 22 and the housing 21 is prevented, and the permanent magnet(s) 23 can be securely fixed in place.

Figure 5:
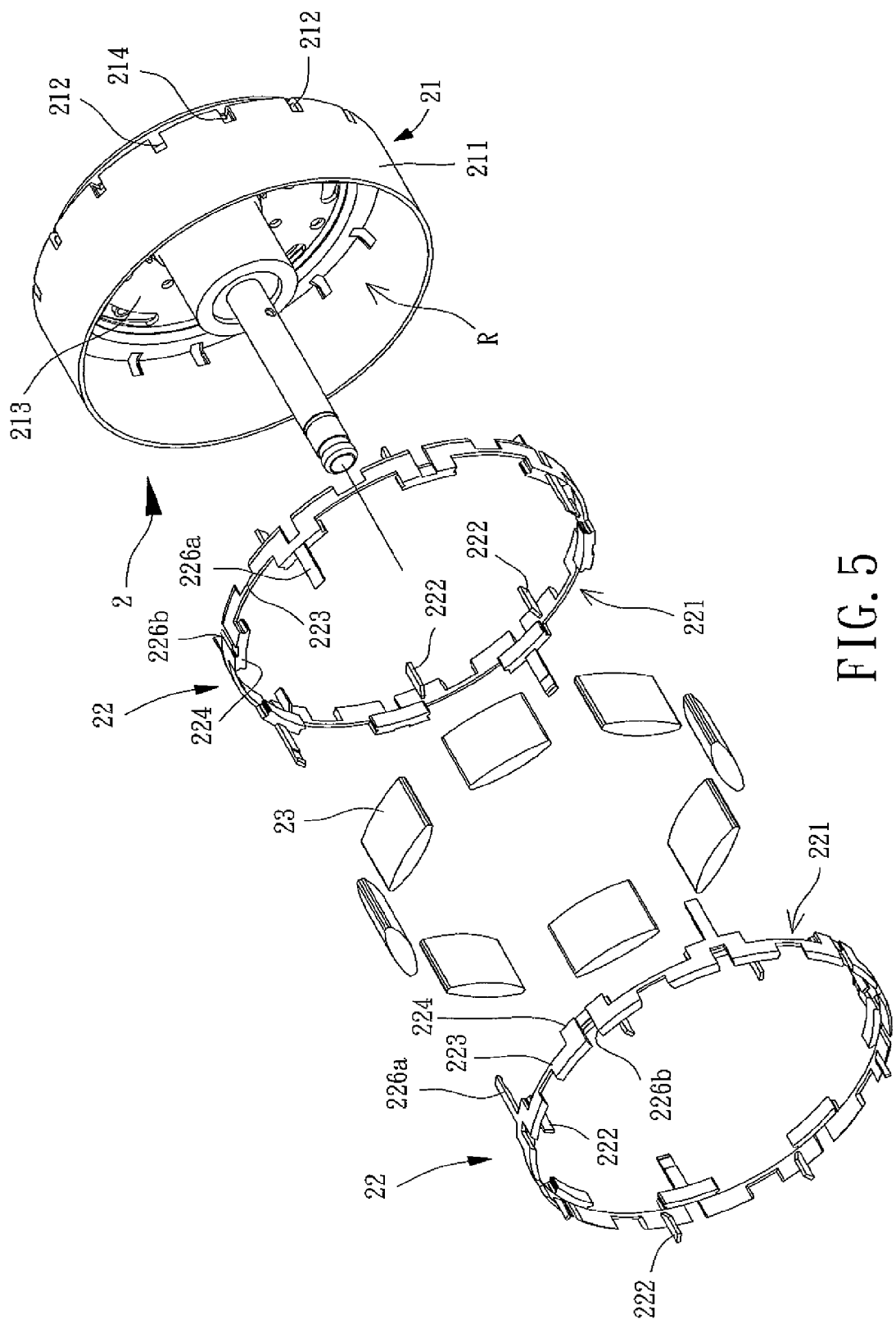
FIG. 5 is an exploded view of a rotor of the ceiling fan motor according to a second embodiment of the invention.

FIG. 5 shows a ceiling fan motor according to a second embodiment of the invention. The ceiling fan motor in this embodiment differs from that of the first embodiment in that the rotor 2 includes first and second positioning members 22 respectively engaged with the lateral wall 211. Each of the first and second positioning members 22 includes a plurality of positioning notches 221. Based on this, the plurality of positioning notches 221 of the first positioning member 22 is aligned with the plurality of positioning notches 221 of the second positioning member 22 along the axial direction of the rotor 2. Thus, each permanent magnet 23 may be engaged in a corresponding pair of the positioning notches 221 of the first and second positioning members 22. In other words, the permanent magnets 23 can be securely clamped between the first and second positioning members 22. Thus, the use of the two positioning members 22 provides the permanent magnets 23 with a reinforced retaining effect.

Specifically, each of the first and second positioning members 22 may include a first coupling portion 226a and a second coupling portion 226b structurally corresponding to the first coupling portion 226a. In the embodiment, the first coupling portion 226a is in the form of a tenon, and the second coupling portion 226b is in the form of an engaging notch. The first coupling portion 226a of the first positioning member 22 is aligned with the second coupling portion 226b of the second positioning member 22 in the axial direction of the rotor 2, and the second coupling portion 226b of the first positioning member 22 is aligned with the first coupling portion 226a of the second positioning member 22 in the axial direction of the rotor 2. As such, the first coupling portions 226a and the second coupling portions 226b can be engaged with each other to couple the first and second positioning members 22 with each other. In this embodiment, each of the first and second positioning members 22 includes a plurality of air-guiding blades 222, in which the plurality of air-guiding blades 222 of the first positioning member 22 is misaligned with the plurality of air-guiding blades 222 of the second positioning member 22 along the axial direction of the rotor 2. Thus, the total number of the air-guiding blades 222 of the rotor 2 that can cause air currents is increased. However, the plurality of air-guiding blades 222 of the first positioning member 22 can also be aligned with the plurality of air-guiding blades 222 of the second positioning member 22 along the axial direction of the rotor 2. In this arrangement, each pair of the combined air-guiding blades 222 will have a large total length and will be able to increase the air-driving range. However, although both the first and second positioning members 22 are shown to include a plurality of air-guiding blades 222 in this embodiment, it is noted that there may be only one positioning member 22 that includes a plurality of air-guiding blades 222.

Based on the above structures, the ceiling fan motors according to the first and second embodiments are characterized as follows. Specifically, a positioning member 22 may be formed on the inner periphery of the housing 21. The positioning member 22 forms a plurality of positioning notches 221 for positioning the permanent magnets 23. In this regard, an air-guiding blade 222 is arranged on the positioning member 22. As such, the air-guiding blade 222 is driven to rotate as the housing 21 rotates, and air currents are generated to provide a cooling effect for the iron core 11 and other components inside the housing 21.

As compared with the conventional ceiling fan motor 9 where the heat generated by the iron core 912 and its windings cannot be effectively dissipated due to the lack of a proper cooling mechanism, the ceiling fan motor of the invention is able to provide an improved cooling effect for the iron core 11 or other components inside the housing 21 via the rotating air-guiding blade 222. It is proven that the ceiling fan motor of the invention is advantageous in terms of cooling efficiency.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A ceiling fan motor comprising:
    a stator assembly comprising an iron core; and
    a rotor rotatably coupled with the stator assembly and comprising a housing, a first positioning member and a plurality of permanent magnets, wherein the housing comprises a lateral wall and a bottom cover coupled with the lateral wall, wherein the lateral wall and the bottom cover jointly form an inner space receiving the iron core, wherein the first positioning member is coupled with the lateral wall, and wherein the plurality of permanent magnets is positioned by the first positioning member,
    wherein the first positioning member comprises a support and a plurality of walls fixed on the support and spaced from each other in a circumferential direction surrounding an axial direction of the rotor, wherein each of the plurality of walls includes a first end and a second end, wherein each of the first end and the second end of the plurality of walls includes an L-shaped extension having a radial section extending radially inwards in a radial direction perpendicular to the axial direction and a circumferential section extending from a free end of the radial section in the circumferential direction, wherein two adjacent L-shaped extensions respectively of two adjacent walls of the plurality of walls and the support together define a positioning notch receiving one of the plurality of permanent magnets,
    wherein the first positioning member further comprises a plurality of air-guiding blades, wherein each of the plurality of air-guiding blades is fixed to one of the plurality of walls, is spaced from the bottom cover in the axial direction of the rotor, and is located between the one of the plurality of walls and the iron core in a radial direction perpendicular to the axial direction.

2. The ceiling fan motor as claimed in claim 1, wherein each of the plurality of air-guiding blades extends from the first positioning member towards the iron core in the radial direction.

3. The ceiling fan motor as claimed in claim 1, wherein the housing forms a plurality of vents extending from an outer surface to an inner surface thereof.

4. The ceiling fan motor as claimed in claim 3, wherein the plurality of vents is arranged on an edge of the lateral wall adjoining the bottom cover, and wherein the plurality of vents is aligned with the plurality of air-guiding blades in the axial direction of the rotor.

5. A ceiling fan motor comprising:
    a stator assembly comprising an iron core; and
    a rotor rotatably coupled with the stator assembly and comprising a housing, a first positioning member, and at least one permanent magnet, wherein the housing comprises a lateral wall, wherein the lateral wall is enclosed to form an inner space receiving the iron core, wherein the first positioning member is coupled with the lateral wall, wherein the at least one permanent magnet is positioned by the first positioning member,
    wherein the first positioning member comprises a plurality of air-guiding blades and at least one positioning notch, wherein the at least one permanent magnet is fixed in the at least one positioning notch, wherein the first positioning member further comprises a support and a plurality of walls, wherein the support is in an annular form and is connected to the plurality of walls, wherein adjacent two of the plurality of walls and the support jointly form one of the at least one positioning notch, wherein the housing further comprises a plurality of fixing notches, wherein a plurality of engaging portions is connected to one face of the first positioning member facing the plurality of fixing notches, wherein the plurality of engaging portions is engaged with the plurality of fixing notches, wherein the housing comprises a bottom cover coupled with the lateral wall, wherein the lateral wall and the bottom cover jointly form the inner space, wherein the plurality of fixing notches is arranged on an edge of the lateral wall adjoining the bottom cover, wherein the plurality of engaging portions is arranged on the support, and wherein the plurality of engaging portions is aligned with the plurality of fixing notches in the axial direction of the rotor.

6. The ceiling fan motor as claimed in claim 5, wherein the rotor further comprises a second positioning member coupled to the lateral wall, wherein the second positioning member also comprises at least one positioning notch, wherein the at least one positioning notch of the first positioning member is aligned with the at least one positioning notch of the second positioning member in the axial direction of the rotor, and wherein the at least one permanent magnet is received in the at least one positioning notch of the first positioning member and the at least one positioning notch of the second positioning member.

7. The ceiling fan motor as claimed in claim 6, wherein the second positioning member also comprises a plurality of air-guiding blades misaligned with the plurality of air-guiding blades of the first positioning member in the axial direction of the rotor.

8. The ceiling fan motor as claimed in claim 6, wherein the at least one positioning notch of each of the first positioning member and the second positioning member comprises a plurality of positioning notches, wherein the at least one permanent magnet includes a plurality of permanent magnets, and wherein each of the plurality of permanent magnets is fixed in one of the plurality of positioning notches of the first positioning member and one of the plurality of positioning notches of the second positioning member.

9. The ceiling fan motor as claimed in claim 5, wherein the at least one permanent magnet comprises a plurality of permanent magnets, wherein the at least one positioning notch comprises a plurality of positioning notches, and wherein each of the plurality of permanent magnets is fixed in a respective one of the plurality of positioning notches.

10. The ceiling fan motor as claimed in claim 6, wherein the at least one positioning notch of the second positioning member comprises a plurality of positioning notches, wherein the second positioning member also comprises a support in an annular form and a plurality of walls connected to the support, wherein two adjacent walls and the support of the second positioning member jointly form one of the plurality of positioning notches of the second positioning member, wherein the second positioning member also comprises a plurality of air-guiding blades, and wherein each of the plurality of air-guiding blades of the second positioning member is fixed to one of the plurality of walls of the second positioning member.

11. A ceiling fan motor comprising:
a stator assembly comprising an iron core; and
a rotor rotatably coupled with the stator assembly and comprising a housing, a first positioning member, a second positioning member, and at least one permanent magnet, wherein the housing comprises a lateral wall, wherein the lateral wall is enclosed to form an inner space receiving the iron core, wherein the first positioning member and the second positioning member are coupled with the lateral wall, wherein the first positioning member comprises a plurality of air-guiding blades and at least one positioning notch, wherein the at least one permanent magnet is fixed in the at least one positioning notch, wherein the second positioning member also comprises at least one positioning notch, and wherein the at least one positioning notch of the first positioning member is aligned with the at least one positioning notch of the second positioning member in an axial direction of the rotor, wherein the at least one permanent magnet is fixed in the at least one positioning notch of the first positioning member and the at least one positioning notch of the second positioning member, and wherein the second positioning member also comprises a plurality of air-guiding blades aligned with the plurality of air-guiding blades of the first positioning member in the axial direction of the rotor.

12. The ceiling fan motor as claimed in claim 11, wherein the first positioning member comprises a support and a plurality of walls, wherein the support is in an annular form and is connected to the plurality of walls, and wherein adjacent two of the plurality of walls and the support jointly form one of the at least one positioning notch.

13. The ceiling fan motor as claimed in claim 12, wherein each of the plurality of air-guiding blades is connected to one of the plurality of walls of the first positioning member.

14. The ceiling fan motor as claimed in claim 12, wherein the housing further comprises a plurality of fixing notches, wherein a plurality of engaging portions is connected to one face of the first positioning member facing the plurality of fixing notches, and wherein the plurality of engaging portions is engaged with the plurality of fixing notches.

15. The ceiling fan motor as claimed in claim 11, wherein the at least one permanent magnet is received in the at least one positioning notch of the first positioning member and the at least one positioning notch of the second positioning member.

16. The ceiling fan motor as claimed in claim 15, wherein the second positioning member also comprises a plurality of air-guiding blades misaligned with the plurality of air-guiding blades of the first positioning member in the axial direction of the rotor.

17. The ceiling fan motor as claimed in claim 11, wherein each of the first and second positioning members comprises a tenon and an engaging notch, wherein the tenon of the first positioning member is aligned with the engaging notch of the second positioning member in the axial direction of the rotor, and wherein the engaging notch of the first positioning member is aligned with the tenon of the second positioning member in the axial direction of the rotor.

18. A ceiling fan motor comprising:
a stator assembly comprising an iron core; and
a rotor rotatably coupled with the stator assembly and comprising a housing, a first positioning member, a second positioning member, and at least one permanent magnet, wherein the housing comprises a lateral wall, wherein the lateral wall is enclosed to form an inner space receiving the iron core, wherein the first positioning member and the second positioning member are coupled with the lateral wall, wherein each of the first positioning member and the second positioning member comprises at least one positioning notch, wherein the at least one permanent magnet is fixed in the at least one positioning notch of the first positioning member and the at least one positioning notch of the second positioning member, wherein the at least one positioning notch of the first positioning member is aligned with the at least one positioning notch of the second positioning member in the axial direction of the rotor, wherein the first positioning member comprises a plurality of air-guiding blades, wherein each of the first and second positioning members comprises a first coupling portion and a second coupling portion, wherein the first coupling portion of the first positioning member is aligned with the second coupling portion of the second positioning member in the axial direction of the rotor, wherein the second coupling portion of the first positioning member is aligned with the first coupling portion of the second positioning member in the axial direction of the rotor, wherein the first coupling portion is in a form of a tenon, and wherein the second coupling portion is in a form of an engaging notch.

19. The ceiling fan motor as claimed in claim 18, wherein the at least one positioning notch of each of the first positioning member and the second positioning member comprises a plurality of positioning notches, wherein the at least one permanent magnet includes a plurality of permanent magnets, and wherein each of the plurality of permanent magnets is fixed in one of the plurality of positioning notches of the first positioning member and one of the plurality of positioning notches of the second positioning member.

20. The ceiling fan motor as claimed in claim 18, wherein the second positioning member comprises a plurality of air-guiding blades misaligned with the plurality of air-guiding blades of the first positioning member in the axial direction of the rotor.

* * * * *